(12) United States Patent
Hyatt

(10) Patent No.: US 10,953,808 B2
(45) Date of Patent: Mar. 23, 2021

(54) VEHICLE UTILITY RACK

(71) Applicant: Jascen Hyatt, Sophia, NC (US)

(72) Inventor: Jascen Hyatt, Sophia, NC (US)

( * ) Notice: Subject to any disclaimer, the term of this patent is extended or adjusted under 35 U.S.C. 154(b) by 0 days.

(21) Appl. No.: 16/391,874

(22) Filed: Apr. 23, 2019

(65) Prior Publication Data
US 2019/0359144 A1 Nov. 28, 2019

Related U.S. Application Data

(60) Provisional application No. 62/674,719, filed on May 22, 2018.

(51) Int. Cl.
*B60R 9/06* (2006.01)
*B60R 9/048* (2006.01)

(52) U.S. Cl.
CPC ...................... *B60R 9/06* (2013.01)

(58) Field of Classification Search
CPC ................... B60R 9/06; B60R 9/048
USPC ................... 224/281, 497, 498, 499
See application file for complete search history.

(56) References Cited

U.S. PATENT DOCUMENTS

| | | | | |
|---|---|---|---|---|
| 1,489,527 A * | 4/1924 | Henry | ....................... | B60R 9/06 220/6 |
| 1,585,871 A * | 5/1926 | Pels | ....................... | H01M 2/06 224/497 |
| 1,625,808 A * | 4/1927 | Hyde | ....................... | B60R 9/06 224/498 |
| 1,686,450 A * | 10/1928 | Henry | ..................... | B60R 5/041 224/498 |
| 1,877,887 A * | 9/1932 | Fulton | .................... | B62D 43/02 224/42.13 |
| 1,886,911 A * | 11/1932 | Schulman | ................. | B60R 9/06 224/491 |
| 2,091,070 A * | 8/1937 | Girl | .......................... | B60R 5/04 414/462 |
| 2,387,779 A * | 10/1945 | Strauss | ................... | B60R 9/045 224/314 |
| 2,514,462 A * | 7/1950 | Bror | ......................... | B60R 9/06 224/497 |
| 2,911,130 A * | 11/1959 | Kitazono | ................. | B62B 9/26 224/409 |
| 3,612,284 A * | 10/1971 | Stoltz | ..................... | D06F 57/12 211/1.3 |
| 4,813,584 A * | 3/1989 | Wiley | ...................... | B60R 9/06 224/501 |
| 5,427,289 A * | 6/1995 | Ostor | ....................... | B60R 9/06 224/282 |

(Continued)

*Primary Examiner* — Nathan J Newhouse
*Assistant Examiner* — Lester L Vanterpool
(74) *Attorney, Agent, or Firm* — Boudwin Intellectual Property; Daniel Boudwin

(57) ABSTRACT

A vehicle utility rack with a foldable frame and floor. The frame includes a back support and two arms attached to the back support with hinges. Each arm includes a top part and a bottom part forming a track therebetween. When the arms are extended, they allow the floor to extend from a stored position to a working position. The floor includes an end support attached to the exterior end. The end support functions as a wall when the floor is in the working position. When the floor is in the stored position, the arms are locked to the back support. This allows the vehicle utility rack to remain closed, even when the vehicle is in motion.

19 Claims, 6 Drawing Sheets

(56) References Cited

U.S. PATENT DOCUMENTS

| | | | | |
|---|---|---|---|---|
| 6,095,387 | A * | 8/2000 | Lipscomb | B60R 9/06 224/485 |
| 6,099,035 | A * | 8/2000 | Garvin, III | B60R 9/06 224/486 |
| 6,152,341 | A | 11/2000 | LeMay et al. | |
| 6,382,486 | B1 * | 5/2002 | Kretchman | B60R 9/06 224/498 |
| 6,712,248 | B2 * | 3/2004 | Mitchell | B60R 9/06 224/498 |
| 7,246,733 | B2 * | 7/2007 | Threet | B60R 9/06 224/498 |
| 7,992,751 | B1 * | 8/2011 | Sweeney | B60R 9/06 224/497 |
| 8,302,829 | B2 * | 11/2012 | Lee | B60R 9/10 224/489 |
| 8,556,145 | B1 * | 10/2013 | Ezra | B60R 9/06 224/498 |
| 9,027,809 | B1 * | 5/2015 | Ezra | B60R 9/06 224/519 |
| 9,096,179 | B2 | 8/2015 | Reiseder | |
| 2003/0155390 | A1 | 8/2003 | Williams et al. | |
| 2007/0175938 | A1 * | 8/2007 | Swenson | B60R 9/06 224/498 |
| 2011/0278336 | A1 | 11/2011 | Landrum | |

\* cited by examiner

VEHICLE UTILITY RACK

CROSS REFERENCE TO RELATED APPLICATIONS

This application claims the benefit of U.S. Provisional Application No. 62/674,719 filed on May 22, 2018. The above identified patent application is herein incorporated by reference in its entirety to provide continuity of disclosure.

BACKGROUND OF THE INVENTION

The present invention relates to utility racks for vehicles. More particularly, the present invention provides a foldable utility rack that is capable of being attached to a hitch mount of a vehicle.

Many people find the need to add extra space to their vehicles to transport large objects or a large quantity of objects. This can be done by adding various types of racks or often by tying things to the roof of a vehicle. In some cases, an extra cargo device can be added to a vehicle's hitch connector. These cargo devices can enable individuals to store coolers, beach items, hunting items, or any other desired items.

Unfortunately, traditional cargo racks are bulky and typically not foldable. These large items also add length to a vehicle and can make them hard to maneuver. However, traditional cargo racks are large and heavy and may not be easy to remove. Therefore, many choose to leave them attached even if they are not in use. This can cause painful results when they are banged into by an individual. In addition, storing traditional cargo racks is often cumbersome, as they occupy a large volume.

Consequently, there is a need for an improvement in the art of vehicle utility racks. The present invention substantially diverges in design elements from the known art, while at the same time solving a problem many individuals face. The present invention provides a vehicle utility rack that easily enables a user to store any desired cargo therein, wherein the vehicle utility rack is collapsible and easy to store, remove, and drive with when empty. In this regard the present invention substantially fulfills the need for a simple, easy to use vehicle utility rack that is also maneuverable between stored and deployed positions.

SUMMARY OF THE INVENTION

The present invention provides a collapsible vehicle utility rack wherein the same can be utilized for providing convenience for the user when moving the vehicle, storing the vehicle utility rack or when attaching or removing the vehicle utility rack. The present vehicle utility rack comprises a first member with a first end and a second end. A connector member is attached, substantially perpendicular, to the first member. A first arm is attached, substantially perpendicular, to the first end of the first member. A second arm is attached, substantially perpendicular, to the second end of the first member. The first and second arms are each capable of folding into a second position substantially parallel with the first member. A planar member is attached to the first member, wherein the planar member is collapsible. The arms and the planar member are attached such that the vehicle utility rack can move between a stored position and a working position.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself, and manner in which it may be made and used, may be better understood after a review of the following description, taken in connection with the accompanying drawings wherein like numeral annotations are provided throughout.

DETAILED DESCRIPTION OF THE INVENTION

Figure 1:
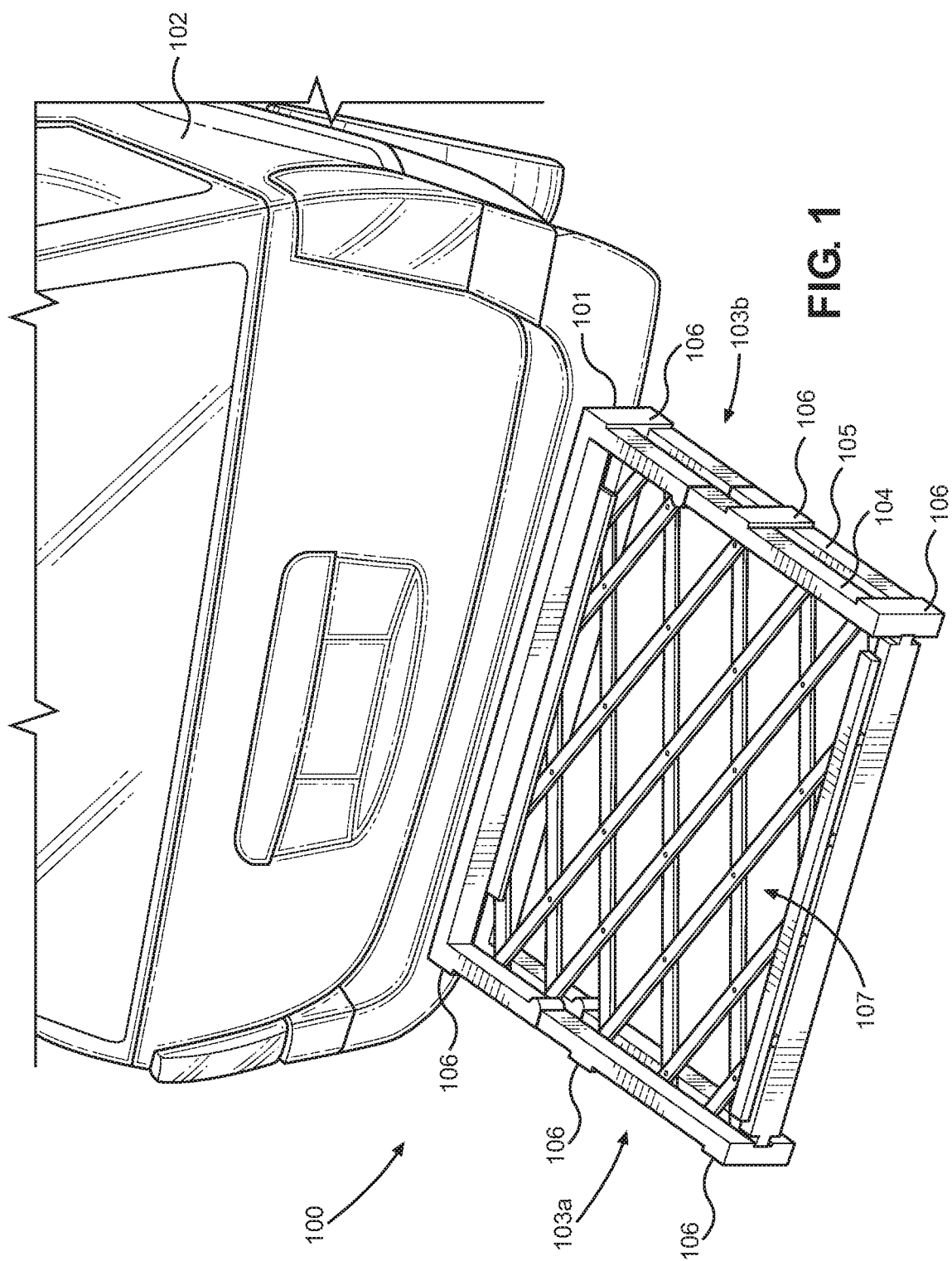
FIG. 1 shows a perspective view of an embodiment of the vehicle utility rack.

Reference is made herein to the attached drawings. Like reference numerals are used throughout the drawings to depict like or similar elements of the vehicle utility rack. For the purposes of presenting a brief and clear description of the present invention, a preferred embodiment will be discussed as used for providing an improved vehicle utility rack. The figures are intended for representative purposes only and should not be considered to be limiting in any respect.

Referring now to FIG. 1, there is shown a perspective view of an embodiment of the vehicle utility rack. The vehicle utility rack includes a first member 101 at the rear of the utility rack 100 close to the vehicle 102. The first member 101 may be a bar of varying thickness and materials. In one embodiment, the bar is made of aluminum to help decrease the weight of the vehicle utility rack and make it easier to transport. In a second embodiment, the vehicle utility rack is made of steel to increase the durability of the vehicle utility rack and increase the potential weight load rating.

The vehicle utility rack further includes two arms 103a, 103b attached to either end of the first member 101. In one embodiment, the arms 103a, 103b comprise an upper portion 104 and a lower portion 105 with connecting members 106a, 106b, 106c. In this embodiment, there is a gap defined between the two members on each arm 103a, 103b to allow a planar member 107 to be slidably placed therebetween. This can ensure that the planar member 107 cannot raise up when the vehicle hits a bump, for example. In other embodiments, the arms 103a, 103b are made of angle iron that will allow the planar member to sit on the arms 103a, 103b. This embodiment can lessen the weight of the vehicle utility rack without compromising strength.

The planar member 107 may include a lattice configuration. This lattice can be of various sizes and thickness. Smaller holes in the lattice structure of the planar member 107 allow it to support smaller objects without them falling through, but may cause the vehicle utility rack to become heavy. In some embodiments, the lattice is configured to collapse in a scissoring action. This will allow the lattice to go from a spread-out pattern to a substantially flat configuration. In one embodiment the lattice is made of aluminum to help decrease the weight of the vehicle utility rack and make it easier to transport. In a second embodiment, the lattice is made of steel to increase the durability of the vehicle utility rack and increase the potential weight load rating.

Figure 2:
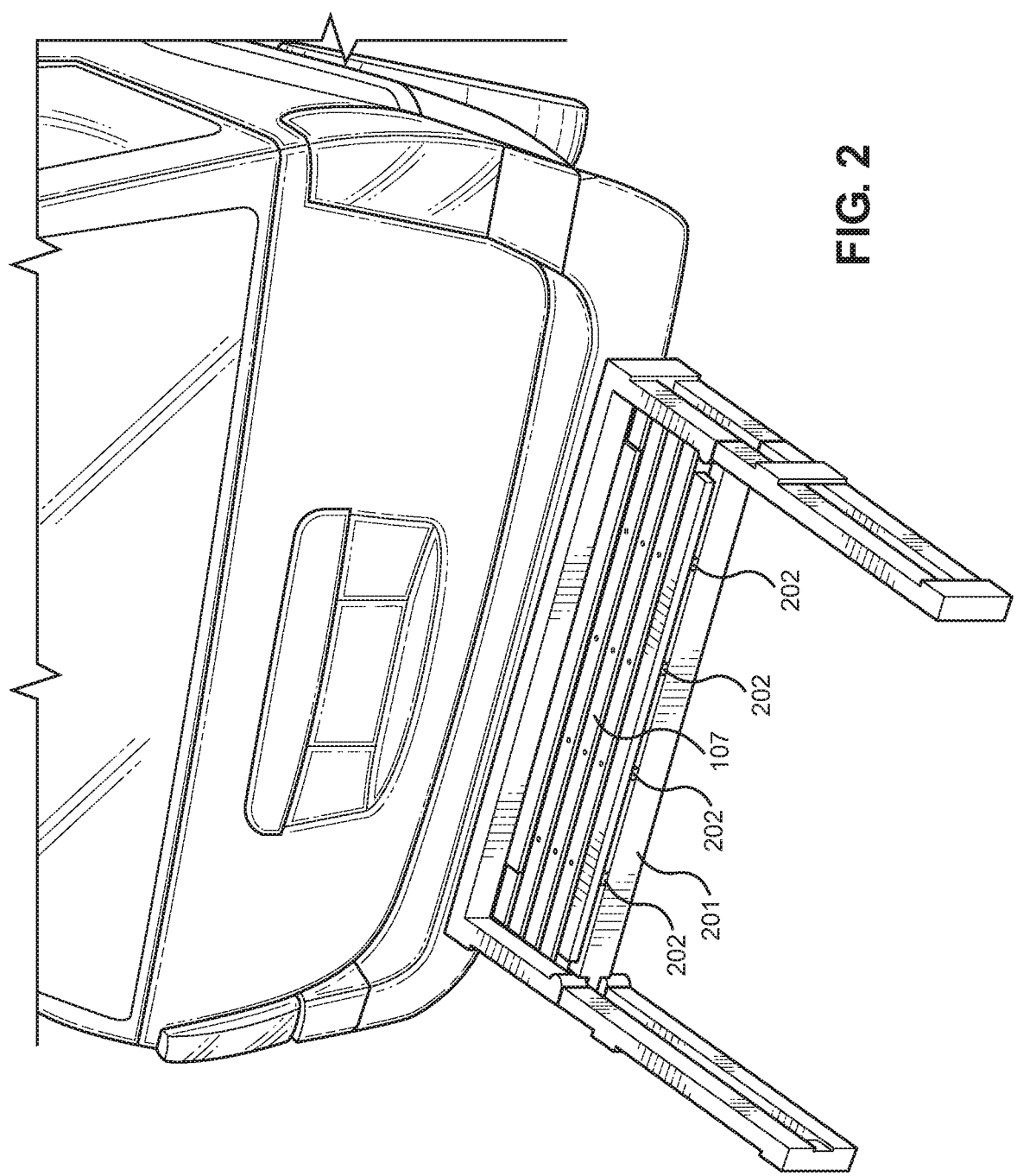
FIG. 2 shows a perspective view of an embodiment of the vehicle utility rack with the planar member in a fully collapsed position.

Referring now to FIG. 2, there is shown a perspective view of an embodiment of the vehicle utility rack with the planar member in a fully collapsed position. The planar member 107 can be collapsed to allow for easier transport and storage. There is a second member 201 that is attached to the planar member 107. The second member 201 rises above the level of the planar member 107. In one embodiment, the second member 201 is slidably connected to the arms 103a, 103b. The second member 201 functions as an edge wall to prevent items from easily sliding from the vehicle utility rack and causing a traffic accident.

The second member 201 is comprises at least one piece of metal and is attached to the planar member 107 using welds. In a second embodiment, the second member 201 is attached to the planar member 107 using bolts. In one embodiment, pins or rivets are used to attach the planar member 107 to the second member 201. In another embodiment, the planar member 107 is attached to the second member 201 using hinges such that the planar member 107 can fold. In an embodiment, the second member 201 is made up of multiple pieces of metal or other materials. In this embodiment, there is a lower bar and an upper bar connected by connectors 202. This allows the second member 201 to have a higher edge and thus help to create a more secure barrier.

Figure 3:
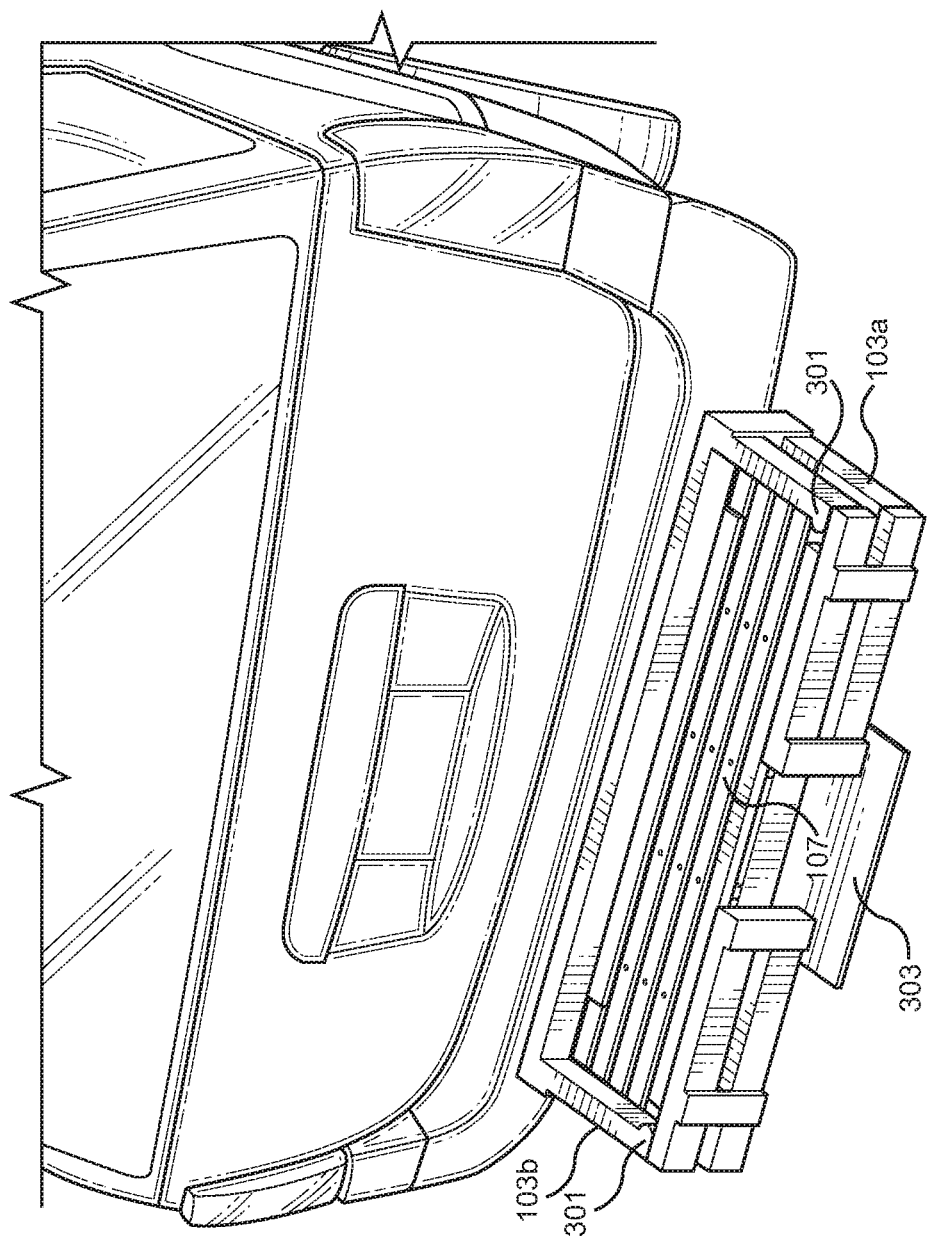
FIG. 3 shows a front view of an embodiment of the vehicle utility rack in a fully collapsed position.

Referring now to FIG. 3, there is shown a front view of an embodiment of the vehicle utility rack in a fully collapsed position. When the planar member 107 is collapsed, the arms 103a, 103b may be folded in to fully collapse the vehicle utility rack. In some embodiments, the arms 103a, 103b have hinges 301 disposed thereon to allow the arms to fold. These hinges 301 are attached to each member of the arms 103a, 103b. By using a hinge connector, the utility rack can be folded while remaining fully assembled. In one embodiment, the hinges 301 are placed between a first end and a second end of the arms 103a, 103b. In this embodiment, the arms are securely fixed to the first member. The arms will fold at a point between the first end and the second end allowing a part of the arm to remain in a perpendicular orientation. This will ensure no lost parts or painstaking assembly. In one embodiment, the hinges are placed between opposite ends of the arms 103a, 103b. This will ensure that the arms 103a, 103b fold around the planar member 107 when it is in a collapsed or stored position.

In one embodiment, the vehicle utility rack is held in a closed position by friction. The arms 103a, 103b create a friction lock between a bottom bar 303 and the arms 103a, 103b. In this embodiment there is a bottom bar 303 attached to a connector member 401. This bottom bar 303 is a single piece of flat metal. The friction lock is created by forming the ends 304a, 304b of the arms 103a, 103b slightly wider than the arms themselves. In this configuration, the arms 103a, 103b will rub against the bottom bar 303 causing friction on only a small area and not along the whole arm. This will ensure that only the ends of the arms 103a, 103b are frictionally locked into the collapsed position and that, once released, the arms 103a, 103b can freely swing.

Figure 4:
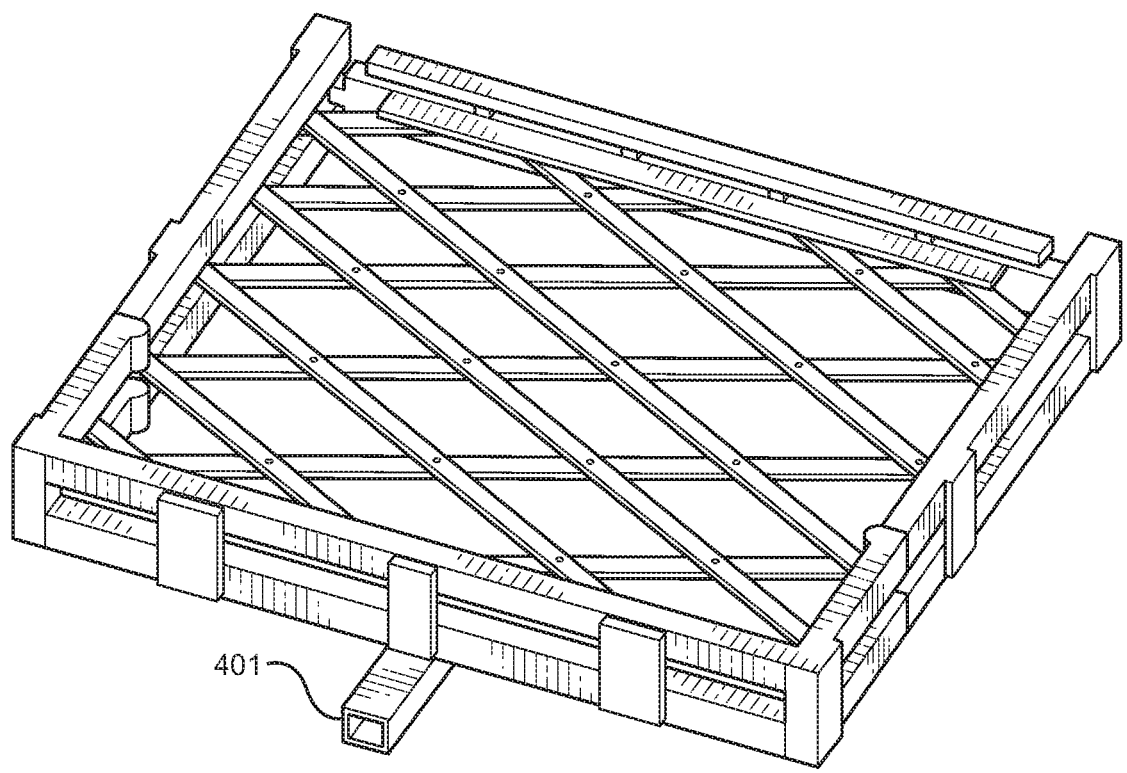
FIG. 4 shows a rear view of an embodiment of the vehicle utility rack in a working position.

Referring now to FIG. 4, there is shown a rear view of an embodiment of the vehicle utility rack in a working position. There is shown an embodiment of a connector 401. The connector is a 2 inch square bar such that it may be attached to any vehicle that supports a similarly sized connector. In a second embodiment, the connector is a 1 inch square bar such that it can be attached to any vehicle that supports that size of connector. There may also be various holes located therethrough the connector of these embodiments to allow for securing the vehicle utility rack to the vehicle using a pin.

In one embodiment, the vehicle utility rack is forty-eight inches in length and twenty-four inches wide when in a working position. This configuration will ensure that the rack is not wider than the vehicle and does not protrude to a length to far behind the vehicle. This also ensures that only a set amount of weight can be added to the vehicle utility rack. In other embodiments, the vehicle utility rack can be upwards of seventy-two inches or more. There is no limit on the length of the vehicle utility rack as long as it does not extend beyond the width of the road. The width can be any length such that the vehicle utility rack can still support weight at the outer ends.

Figure 5:
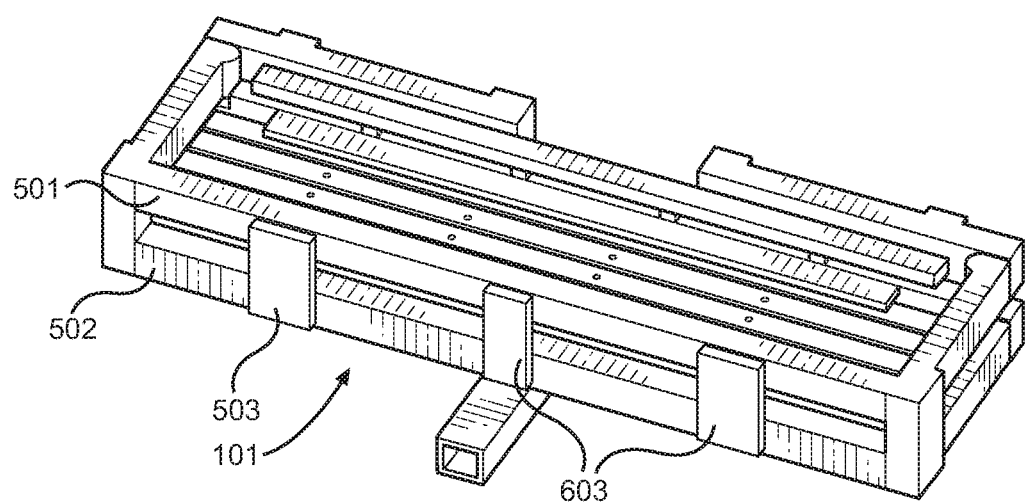
FIG. 5 shows a rear view of an embodiment of the vehicle utility rack in a fully collapsed position.

Referring now to FIG. 5, there is shown a rear view of an embodiment of the vehicle utility rack in a fully collapsed position. The first member 101 can be made up of a top portion 501 and a bottom portion 502 connected by connectors 503 thereon. In this embodiment, the planar member 107 can be connected to the first member 101, forming a gap between the top portion 501 and the bottom portion 502. The first member 101 can be attached to the planar member 107 in various ways depending on the type of planar member 107. In one embodiment, pins or rivets are used to attach the planar member 107. In a second embodiment, the planar member 107 is attached using hinges such that the planar member 107 can fold.

In one embodiment, when in the fully collapsed position, the vehicle utility rack can measure forty-eight inches in length. In the fully collapsed position, the width of the vehicle utility rack measures six inches or less. However, in other embodiments, the vehicle utility rack can be wider, and there is no limit to the width of the rack so long as the utility rack has the ability to be placed in a fully collapsed position.

Figure 6:
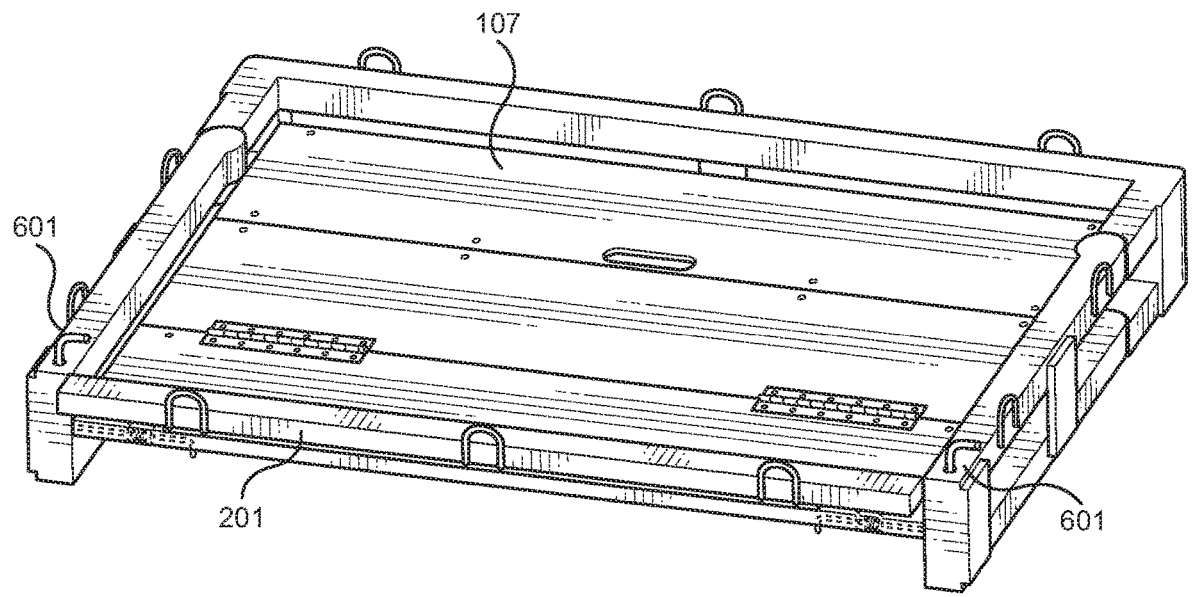
FIG. 6 shows a zoomed view of an embodiment of the vehicle utility rack where the rack uses pins to lock the rack in the working position.

Referring now to FIG. 6, there is shown a zoomed view of an embodiment of the vehicle utility rack where the rack uses pins to lock the vehicle utility rack in the working position. In one embodiment, there are holes in the second member 201 that correspond to holes in the arms 103a, 103b. These holes are such that a large pin 601 may be placed through the holes. Once the pin 601 is inserted, a cotter pin may be placed through the pin 601 to secure the pin 601 in place. This will make sure that the planar member 107 cannot fold back into a collapsed position. These large pins 601 will also make sure that the arms 103a, 103b stay in a locked-out position. This will ensure that the utility rack remains in a sturdy working position when in use.

In one embodiment, there are strap loops attached to the perimeter of the vehicle utility rack. In one embodiment, the strap loops are metal. In one embodiment, the strap loops are welded to the frame of the vehicle utility rack.

Figure 7:
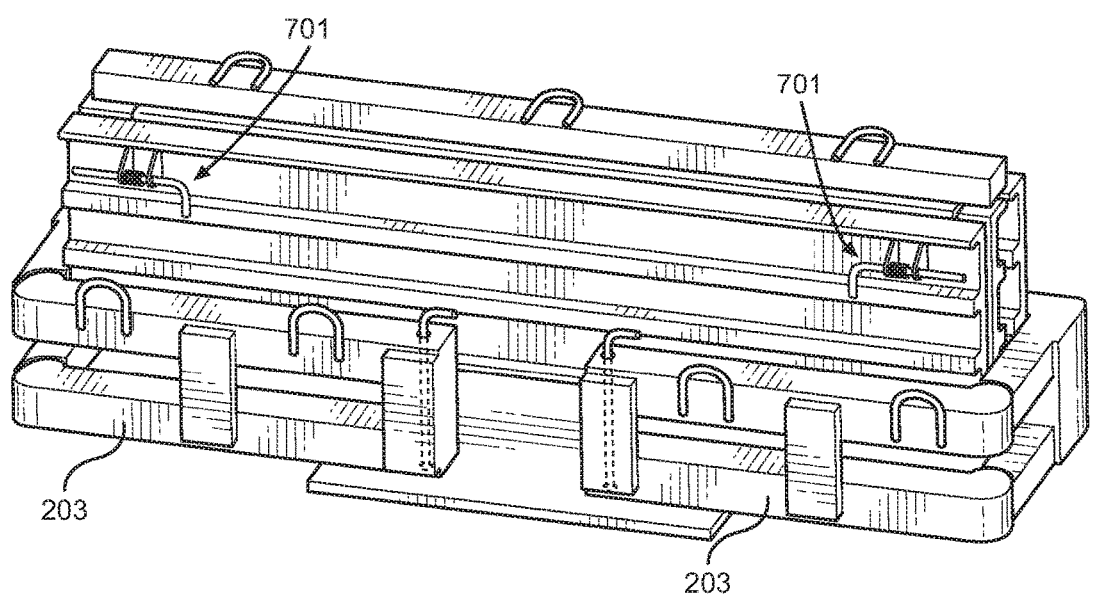
FIG. 7 shows a zoomed view of an embodiment of the vehicle utility rack where the rack uses pins to secure the rack in the fully collapsed position.

Referring now to FIG. 7, there is shown a zoomed view of an embodiment of the vehicle utility rack where the rack uses pins to lock the rack in the fully collapsed position. In one embodiment, there are holes in the bottom member 203 that correspond to holes in the arms 103a, 103b. These holes are such that a large pin 701 may be placed through the holes. Once the pin is inserted, a cotter pin may be placed through the pin 701 to secure it in place. This will make sure that the planar member cannot unfold and enter a working position. These large pins 701 will also make sure that the arms will stay in a folded position. This will ensure that the utility rack remains fully collapsed when not in use and it does not accidentally enter the working position and cause damage to the surroundings.

In one embodiment, there are spring biased pins located on a bottom side of at least one solid plate. In one embodiment, the spring biased pins align with holes in the arms when the vehicle utility rack is in a working position. In this embodiment, the spring biased pins will hold the vehicle utility rack in a working position. In one embodiment, the spring biased pins will align with holes in the arms when in a closed position. In this embodiment, the spring biased pins will hold the vehicle utility rack in a fully collapsed position.

Figure 8:
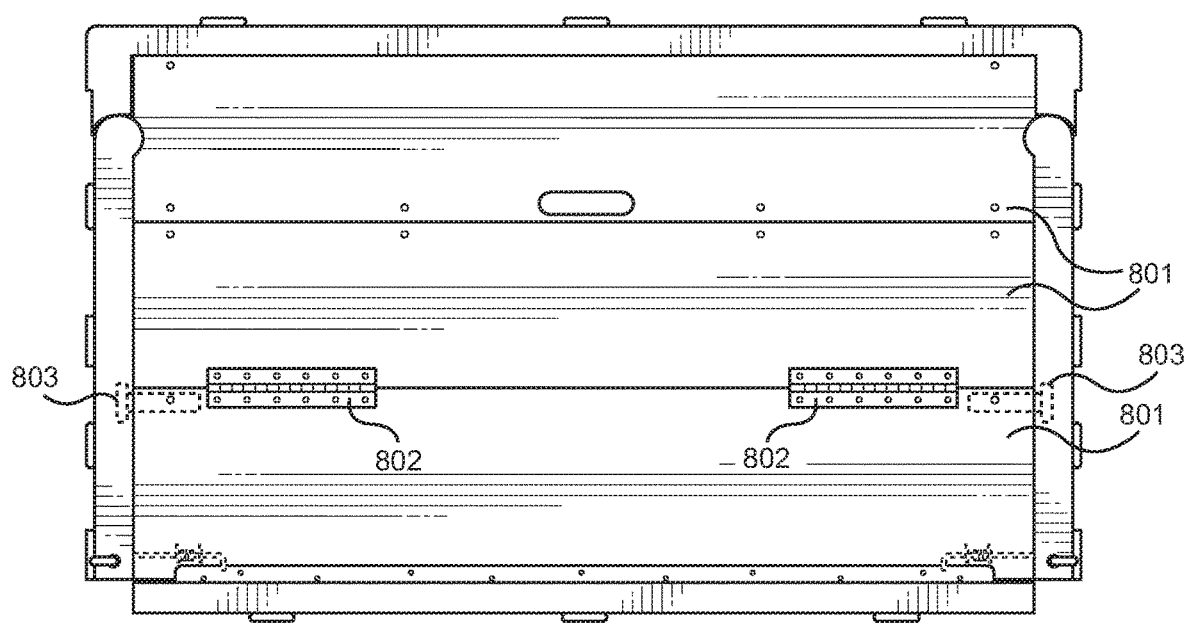
FIG. 8 shows a top down view of an embodiment of the invention where the planar member is solid and foldable.

Referring now to FIG. 8, there is shown a top down view of an embodiment of the invention where the planar member is comprised of solid metal plates. The solid metal plates 801 are attached to one another using a plurality of hinges 802. In one embodiment the hinge 802 connectors are comprised of cross bars 804 that go from one arm to the other arm. In this embodiment, there can be rollers 803 attached to the ends of the cross bars. In another embodiment, rollers 803 are attached directly to the solid metal plates 801. These rollers 803 are placed in the groove created by some embodiments of the arms. In other embodiments, the cross bars 804 themselves can be capable of rolling, and thus allowing the planar member to be placed in a fully collapsed or working position.

In some embodiments, when the solid planar member is in the working position not every cross bar will be resting on the arms. In these embodiments, at least one roller 803 will be attached to each side of the planar member 107 to ensure that there is adequate support of the planar member 107. In one embodiment, there is a hand hole in at least one solid metal plate. This hand hole will allow a user to pull up on the plates moving the vehicle utility rack to a fully collapsed position.

In addition, in some embodiments the solid metal plates 801 have a plurality of small holes therein. This can ensure that water and other particles do not get stuck on the planar member 107. These holes can be placed in any configuration and do not have to be spread evenly over the solid metal plates 801.

In various embodiments, the solid metal plates 801 can be made of aluminum to create a balance between weight and strength. In other embodiments, the solid metal plates 801 can be made of steel to add strength. There may be any number of solid metal plates 801, however, in the shown embodiment, there are 3 solid metal plates 801. These plates can be any length that will fit into the utility rack. The widths of the plates can vary depending on the desired width of the vehicle utility rack.

Figure 9:
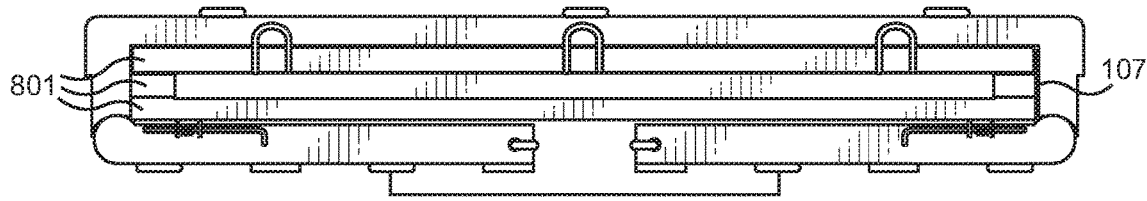
FIG. 9 shows a top perspective view of an embodiment the utility rack in a folded and closed position.

Referring now to FIG. 9, there is shown a top perspective view of the vehicle utility rack in a folded and closed position. In this position, the planar member 107 is folded toward the first member in an alternating fashion. This means that every other solid metal plate 801 will fold up and every other solid metal plate 801 will fold down. In an embodiment with only two solid metal plates 801, the solid metal plates 801 may fold in either direction.

Figure 10:
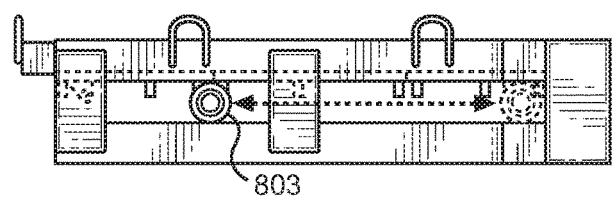
FIG. 10 shows a side perspective view of an embodiment the utility rack in a folded and closed position.

Referring now to FIG. 10, there is shown a side perspective view of an embodiment the utility rack in a folded and closed position. In the shown embodiment, the vehicle utility rack includes rollers 803 that are attached to at least one metal plate. The rollers are configured to act on the arms such that they roll over the lower portion of the arms. In this embodiment, the rollers will help move the metal plates from a stored position to a deployed position.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle utility rack comprising:
a first member with a first end and a second end;
a connector member attached to the first member, wherein the connector is attached perpendicular, to the first member;
a first arm attached, perpendicular, to the first end of the first member;
a second arm attached, perpendicular, to the second end of the first member;
the first and the second arm each configured to fold to a position parallel with the first member;
a planar member attached to the first member, wherein the planar member is collapsible;
wherein the planar member rests within a gap located in the arms when the planar member is in a working position;
a second member secured to the planar member opposite the connection the first member;
wherein the second member rises above the plane of the planar member; and
wherein the second member is slidably attached to the first arm and the second arm.

2. The vehicle utility rack of claim 1, wherein the connector is attached to a center of the first member.

3. The vehicle utility rack of claim 1, wherein the first arm and second arm are disposed in the same horizontal plane as the first member.

4. The vehicle utility rack of claim 1, wherein the connector member is a vehicle hitch mount.

5. The vehicle utility rack of claim 3, wherein the connector is a two-inch connector.

6. The vehicle utility rack of claim 3, wherein the connector is a one-inch connector.

7. The vehicle utility rack of claim 1, further comprising one or more hinges disposed in the arms between a first end and a second end of the arms.

8. The vehicle utility rack of claim 1, wherein the planar member is slidably attached to the arms.

9. The vehicle utility rack of claim 1, wherein the planar member is rollable along a surface.

10. The vehicle utility rack of claim 1, wherein the planar member comprises a scissor type lattice.

11. The vehicle utility rack of claim 1, wherein the planar member comprises a plurality of solid plates.

12. The vehicle utility rack of claim 11, wherein the plurality of solid plates comprises holes disposed therethrough.

13. A vehicle utility rack comprising:
a first member with a first end and a second end;
a connector member attached to the first member, wherein the connector is attached perpendicular, to the first member;
a first arm attached, perpendicular, to the first end of the first member;
a second arm attached, perpendicular, to the second end of the first member;
the first and the second arm each configured to fold to a position parallel with the first member;
a planar member attached to the first member, wherein the planar member is collapsible;
wherein the planar member is rests within a gap located in the arms when the planar member is in a working position;
one or more locks configured to maintain the vehicle utility rack in a folded position, and one or more locks configured to maintain the vehicle utility rack in a working position;
a second member secured to the planar member opposite the connection the first member;
wherein the second member rises above the plane of the planar member; and
wherein the second member is slidably attached to the first arm and the second arm.

14. The vehicle utility rack of claim 13, wherein the planar member comprises a scissor type lattice.

15. The vehicle utility rack of claim 13, wherein the connector is attached to a center of the first member.

16. The vehicle utility rack of claim 13, further comprising one or more hinges disposed in the arms between a first end and a second end of the arms.

17. The vehicle utility rack of claim 13, wherein the connector member is a vehicle hitch mount.

18. The vehicle utility rack of claim 17, wherein the connector is a one-inch connector.

19. The vehicle utility rack of claim 17, wherein the connector is a two-inch connector.

* * * * *